United States Patent
Hua et al.

(10) Patent No.: US 12,468,601 B1
(45) Date of Patent: Nov. 11, 2025

(54) LOAD BALANCING FOR ERASURE CODING WITH MULTIPLE PARITIES

(71) Applicant: Dell Products L.P., Hopkinton, MA (US)

(72) Inventors: Kuolin Hua, Natick, MA (US); Kunxiu Gao, Boxborough, MA (US); Michael Scharland, Franklin, MA (US); Jiahui Wang, Southborough, MA (US)

(73) Assignee: Dell Products L.P., Hopkinton, MA (US)

( * ) Notice: Subject to any disclaimer, the term of this patent is extended or adjusted under 35 U.S.C. 154(b) by 58 days.

(21) Appl. No.: 18/656,635

(22) Filed: May 7, 2024

(51) Int. Cl.
*G06F 11/00* (2006.01)
*G06F 11/10* (2006.01)

(52) U.S. Cl.
CPC ...... *G06F 11/1092* (2013.01); *G06F 11/1088* (2013.01)

(58) Field of Classification Search
CPC .................. G06F 11/1088; G06F 11/1092
See application file for complete search history.

(56) References Cited

U.S. PATENT DOCUMENTS

| | | | |
|---|---|---|---|
| 7,647,526 B1 * | 1/2010 | Taylor ................ | G06F 11/2094 714/6.32 |
| 11,314,608 B1 * | 4/2022 | Hua ..................... | G06F 3/0689 |
| 11,340,789 B2 * | 5/2022 | Hua ..................... | G06F 3/0619 |
| 2013/0219214 A1 * | 8/2013 | Samanta ............. | G06F 11/1092 714/E11.122 |

\* cited by examiner

*Primary Examiner* — Marc Duncan
(74) *Attorney, Agent, or Firm* — Anderson Gorecki LLP (57) ABSTRACT

In a drive cluster in which multiple parity EC (N+P) is implemented, rebuild-related reads are balanced across drives for recovery from drive failure. N members per protection group are read and (P−1) members are skipped, where skipping a member means omission from member rebuild calculations. Per-disk skip counts are calculated, and members that are eligible to be skipped are selected such that per-disk read counts are balanced.

20 Claims, 12 Drawing Sheets

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j | j | j | j | j | j | j | j | j | j |   | a | b | c |
| 2 | k | k | k | k | k | k | k | k | k |   | a | b | c | d |
| 3 | l | l | l | l | l | l | l | l |   | l | b | c | d | e |
| 4 | m | m | m | m | m | m | m | a |   | m | c | d | e | f |
| 5 | d | e | f | g | h | i | m | b | m | c | d | e | f | g |
| 6 | e | f | g | h | i | a | a | c | b | d | e | f | g | h |
| 7 | f | g | h | i | a | b | b | d | c | e | f | g | h | i |
| 8 | g | h | i | a | b | c | c | e | d | f | g | h | i | m |
| 9 | h | i | a | b | c | d | d | f | e | g | h | i | l | a |
| 10 | i | a | b | c | d | e | e | f | g | h | i | k | a | b |

Figure 3

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j | j | j | j | j | j | j | j | j | j | j | a | b | c |
| 2 | k | k | k | k | k | k | k | k | k | k | a | b | c | d |
| 3 | l | l | l | l | l | l | l | l | l | l | b | c | d | e |
| 4 | m | m | m | m | m | m | m | m | m | m | c | d | e | f |
| 5 | d | e | f | g | h | i | i | a | b | c | d | e | f | g |
| 6 | e | f | g | h | i | h | a | b | c | d | e | f | g | h |
| 7 | f | g | h | i | g | a | b | c | d | e | f | g | h | i |
| 8 | g | h | i | f | a | b | c | d | e | f | g | h | i | m |
| 9 | h | i | e | a | b | c | d | e | f | g | h | i | l | a |
| 10 | i | d | a | b | c | d | e | f | g | h | i | k | a | b |
| cell count | 9 | 8 | 7 | 7 | 6 | 6 | 6 | 6 | 7 | 8 | 6 | 7 | 7 | 7 |
| # reads | | | | | | | | | 1 | 1 | 1 | | | |
| # writes | 1 | 1 | 1 | 1 | 1 | 1 | 1 | 1 | 1 | 1 | | | | |

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j | j | j | j | j | j | j | j | j | j | j | a | b | c |
| 2 | k | k | k | k | k | k | k | k | k | k | a | b | c | d |
| 3 | l | l | l | l | l | l | l | l | l | l | b | c | d | e |
| 4 | m | m | m | m | m | m | m | m | m | m | c | d | e | f |
| 5 | d | e | f | g | h | i |   | a | b | c | d | e | f | g |
| 6 | e | f | g | h | i |   | a | b | c | d | e | f | g | h |
| 7 | f | g | h | i |   | a | b | c | d | e | f | g | h | i |
| 8 | g | h | i |   | a | b | c | d | e | f | g | h | i | m |
| 9 | h | i |   | a | b | c | d | e | f | g | h | i | l | a |
| 10 | i |   | a | b | c | d | e | f | g | h | i | k | a | b |

| cell count | | | | | | | | | | | |
|---|---|---|---|---|---|---|---|---|---|---|---|
| C(n) # reads | 9 | 8 | 7 | 6 | 6 | 6 | 6 | 6 | 7 | 8 | 6 |
| S(n) # skips | 3 | 2 | 1 | 0 | 0 | 0 | 0 | 0 | 1 | 2 | 0 |

Figure 6

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j |   | j | j | j | j | j | j | j | j | j | a | b | c |
| 2 | k |   | k | k | k | k | k | k | k | k | a | b | c | d |
| 3 | l | m | l | l | l | l | l | l | l | l | b | c | d | e |
| 4 | m | e | m | m | m | m | m | m | m | m | c | d | e | f |
| 5 | d | f | f | g | h | i | i | a | b | c | d | e | f | g |
| 6 | e | g | g | h | i | h | a | b | c | d | e | f | g | h |
| 7 | f | h | h | i | g | a | b | c | d | e | f | g | h | i |
| 8 | g | i | i | f | a | b | c | d | e | f | g | h | i | m |
| 9 | h | — | e | a | b | c | d | e | f | g | h | i | l | a |
| 10 | i | d | a | b | c | d | e | f | g | h | i | k | a | b |

| cell count | | | | | | | | | | | | | | |
|---|---|---|---|---|---|---|---|---|---|---|---|---|---|---|
| C(n) # reads | 6 | 8 | 7 | 6 | 6 | 6 | 6 | 7 | 8 | 6 |   |   |   |   |
| S(n) # skips | 0 | 2 | 1 | 0 | 0 | 0 | 0 | 1 | 2 | 0 |   |   |   |   |

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j | | j | j | j | j | j | j | j | j | j | a | b | c |
| 2 | k | | k | k | k | k | k | k | k | k | a | b | c | d |
| 3 | l | m | | l | l | l | l | l | l | l | b | c | d | e |
| 4 | m | e | f | m | m | m | m | m | m | c | c | d | e | f |
| 5 | d | f | g | g | h | i | i | a | b | d | d | e | f | g |
| 6 | e | g | h | h | i | h | a | b | c | | e | f | g | h |
| 7 | f | h | i | i | g | a | b | c | | e | f | g | h | i |
| 8 | g | i | e | f | a | b | c | d | e | f | g | h | i | m |
| 9 | h | | a | a | b | c | d | e | f | g | h | i | | a |
| 10 | i | d | | b | c | d | e | f | g | h | i | k | a | b |

| cell count | | | | | | | | | | |
|---|---|---|---|---|---|---|---|---|---|---|
| C(n) # reads | 6 | 6 | 7 | 7 | 6 | 6 | 6 | 6 | 6 | 6 |
| S(n) # skips | 0 | 0 | 1 | 1 | 0 | 0 | 0 | 0 | 0 | 0 |

| cell\disk | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | j | | j | j | j | j | j | j | j | j | j | a | b | c |
| 2 | k | | k | k | k | k | k | k | k | k | a | b | c | d |
| 3 | l | | | l | l | l | l | l | l | l | b | c | d | e |
| 4 | m | m | | m | m | m | m | m | m | m | c | d | e | f |
| 5 | d | e | f | g | h | i | m | a | b | c | d | e | f | g |
| 6 | e | f | g | h | i | a | b | c | d | e | f | g | h | i |
| 7 | f | g | h | i | a | b | c | d | e | f | g | h | i | m |
| 8 | g | h | i | a | b | c | d | e | f | g | h | i | m | a |
| 9 | h | i | a | b | c | d | e | f | g | h | i | k | l | m |
| 10 | i | d | a | b | c | d | e | f | g | h | i | k | l | m |

| cell count | | | | | | | | | | |
|---|---|---|---|---|---|---|---|---|---|---|
| C(n) # reads | 6 | 6 | 7 | 6 | 6 | 6 | 6 | 6 | 6 | 6 |
| S(n) # skips | 0 | 0 | 1 | 0 | 0 | 0 | 0 | 0 | 0 | 0 |

Figure 12

LOAD BALANCING FOR ERASURE CODING WITH MULTIPLE PARITIES

TECHNICAL FIELD

The subject matter of this disclosure is generally related to electronic data storage.

BACKGROUND

Electronic data storage systems use features such as Redundant Array of Independent Drives (RAID) to help avoid data loss when disk drives fail. Such data protection features enable a failed protection group member to be rebuilt using the remaining members of its protection group. Individual disk drives can be configured as protection group members, such as in RAID-1 disk replication, but it is more common for disk drives to be organized into a plurality of same-size cells (also known as partitions), each of which is used either for storing a protection group member or reserved as spare capacity for rebuilding a failed protection group member. Each member of a protection group is maintained on a different disk drive so that multiple members are not lost due to the failure of any single drive. A RAID-L (D+P) protection group has D data members and P parity members that define a width W=(D+P) for a RAID level L. The data members store data. The parity members store parity information such as XORs of the data values. Several commonly used RAID levels with single parity are capable of recovering from the loss of no more than a single drive at a time. Multiple parity erasure coding (EC) encodes and partitions data into fragments in a way that enables recovery of the original data even if multiple fragments become unavailable. An erasure code such as EC (8+2), for example, enables recovery from two concurrent drive failures.

SUMMARY

A method in accordance with some implementations comprises: for a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster, balancing rebuild-related read operations in the event of drive failure by: computing a skip count $S(n)$ for each non-failed drive n; selecting a protection group having a member on a failed one of the drives; for the selected protection group, selecting one of the non-failed drives having a corresponding member of the selected protection group and being characterized by $S(n)>0$; selecting the corresponding member on the selected non-failed drive to be skipped during rebuild; decrementing $S(n)$; and iterating until $S(n)=0$ for all the non-failed drives.

An apparatus in accordance with some implementations comprises: a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster; a plurality of interconnected compute nodes that manage access to the drives; and a rebuild controller configured to: compute a skip count $S(n)$ for each non-failed drive n; select a protection group having a member on a failed one of the drives; for the selected protection group, select one of the non-failed drives having a corresponding member of the selected protection group and being characterized by $S(n)>0$; select the corresponding member on the selected non-failed drive to be skipped during rebuild; decrement $S(n)$; and iterate until $S(n)=0$ for all the non-failed drives.

In accordance with some implementations, a computer-readable storage medium stores instructions that when executed by a computer cause the computer to perform a method comprising: for a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster, balancing rebuild-related read operations in the event of drive failure by: computing a skip count $S(n)$ for each non-failed drive n; selecting a protection group having a member on a failed one of the drives;

for the selected protection group, selecting one of the non-failed drives having a corresponding member of the selected protection group and being characterized by $S(n)>0$; selecting the corresponding member on the selected non-failed drive to be skipped during rebuild; decrementing $S(n)$; and iterating until $S(n)=0$ for all the non-failed drives.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

U.S. Pat. No. 11,340,789 titled PREDICTIVE REDISTRIBUTION OF CAPACITY IN A FLEXIBLE RAID SYSTEM and U.S. Pat. No. 11,314,608 titled CREATING AND DISTRIBUTING SPARE CAPACITY OF A DISK ARRAY are incorporated by reference. The incorporated patents describe techniques for maintaining predictable distribution of protection group members and spares in compliance with RAID requirements as a drive cluster is scaled-up and eventually split into multiple clusters. Advantages associated with maintaining predictable distribution of protection group members and spares include facilitating recovery from disk failure and facilitating iterative drive cluster growth and split cycles. The presently disclosed invention may be predicated in part on recognition that unbalanced rebuild-related reads tend to increase the amount of time required to rebuild the entire set of protection group members of a failed drive. Further, since only a subset of the remaining members may be needed to rebuild a member that was on a failed drive when there are multiple parities, selective use and non-use of the remaining members can balance the rebuild-related reads.

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

Figure 1:
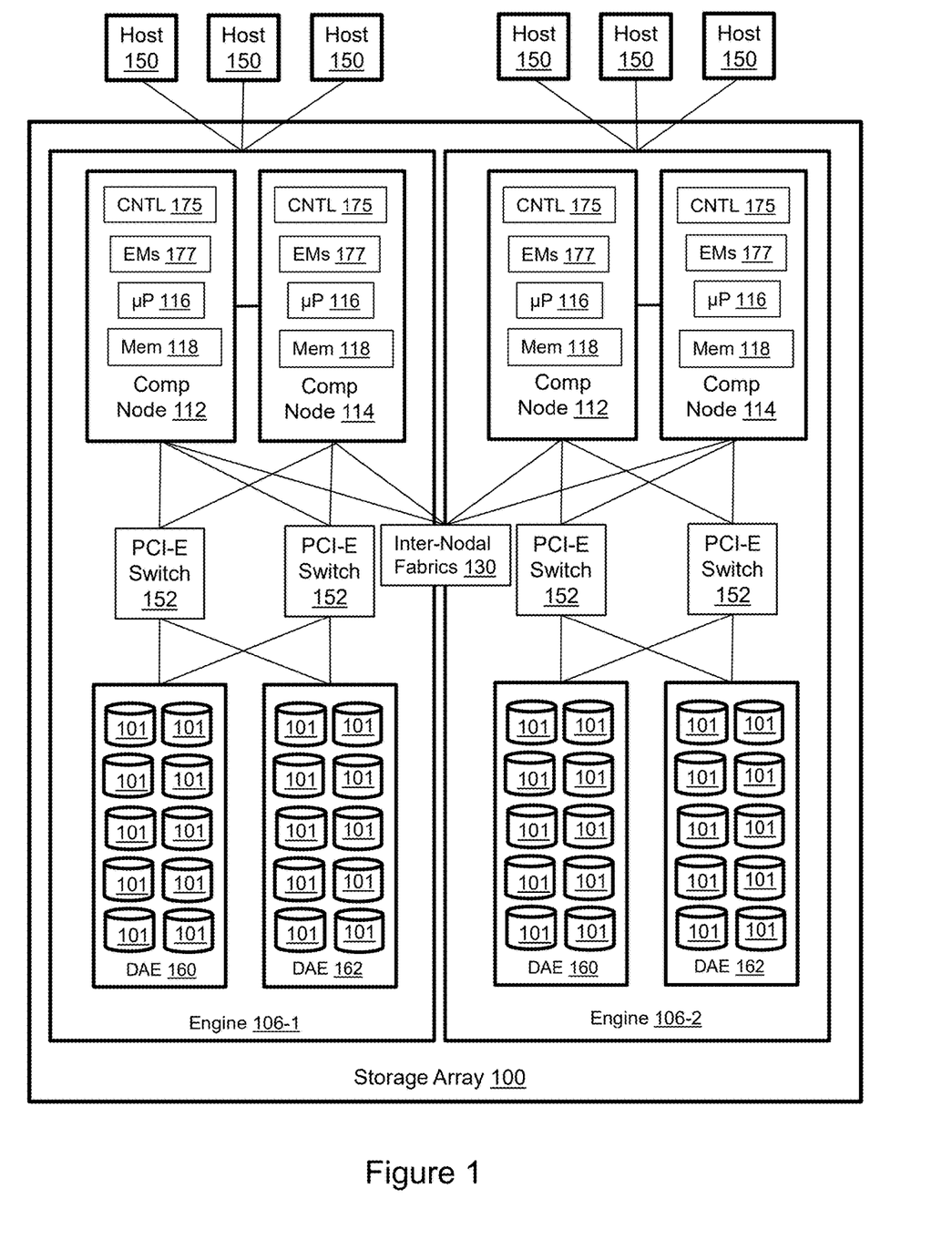
FIG. 1 illustrates a storage array with rebuild controllers that are configured to balance rebuild-related read operations across drives by selectively skipping the protection group members on some drives when rebuilding the protection group members of a failed drive in a multiple parity EC environment.

FIG. 1 illustrates a storage array 100 with rebuild controllers 175 that are configured to balance rebuild-related read operations across drives in a multiple parity data protection system by selectively skipping the protection group members on some drives when rebuilding the protection group members of a failed drive. The illustrated storage array includes two engines 106-1, 106-2. However, the storage array might include any number of engines. Each engine includes disk array enclosures (DAEs) 160, 162 and a pair of peripheral component interconnect express (PCI-e) interconnected compute nodes 112, 114 (also known as storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. Controllers 175 may include one or more of: special purpose electronic components, logic, and computer program code loaded into memory 118 from the managed drives 101 and run on the processors 116.

Figure 2:
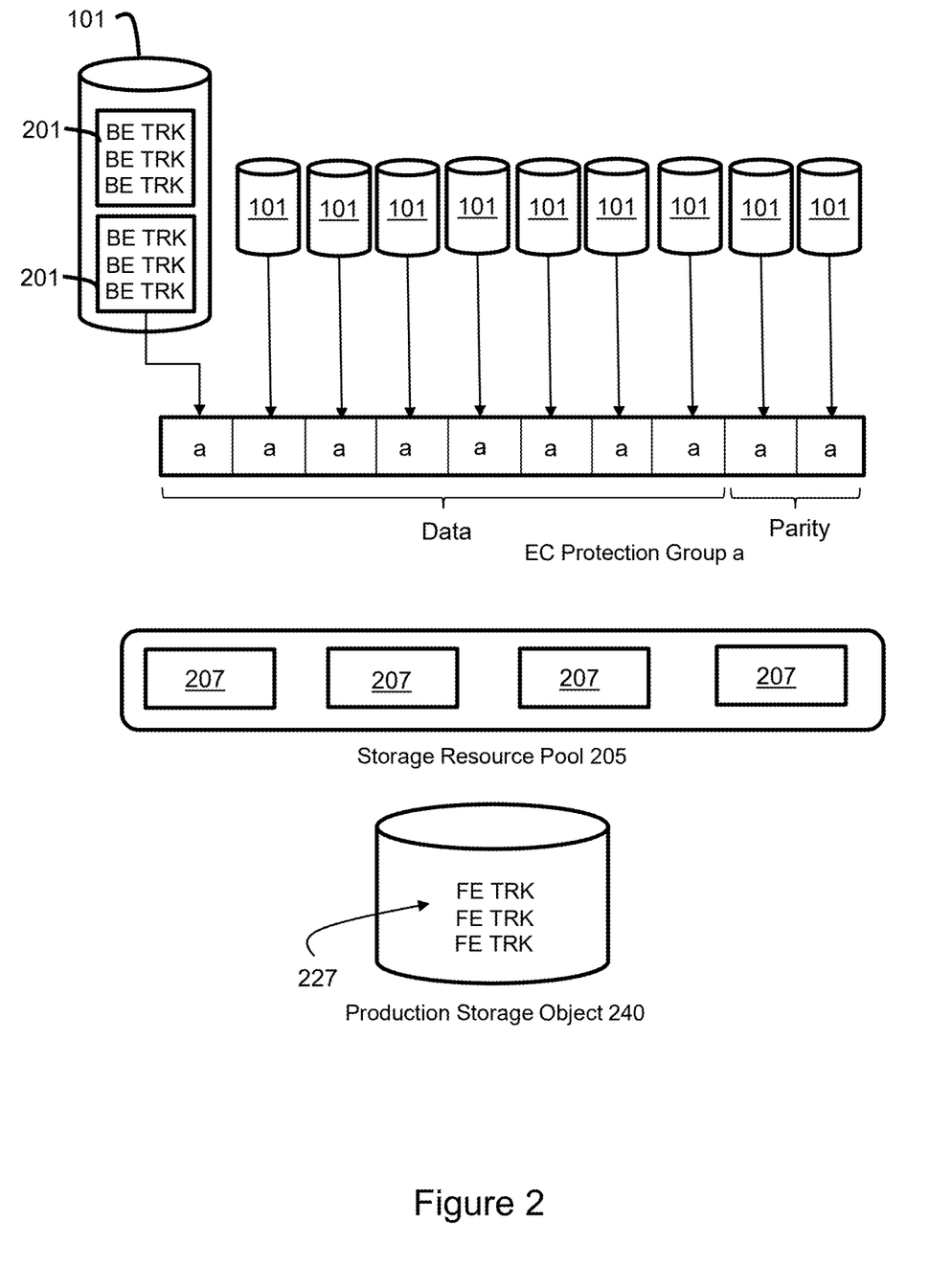
FIG. 2 illustrates layers of abstraction between the managed drives and a production storage object of the storage array of FIG. 1.

Referring to FIGS. 1 and 2, data that is created and used by instances of the host applications running on the host servers 150 is maintained on the managed drives 101. The managed drives are not discoverable by the host servers 150, so the storage array creates logical production storage objects such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata that maps between the LBAs of the production volume 240 and physical addresses on the managed drives 101 in order to process IOs from the host servers. Each production storage object is uniquely associated with a single host application. The storage array may maintain a plurality of production storage objects and simultaneously support multiple host applications.

The basic allocation unit of storage capacity that is used by the compute nodes 112, 114 to access the managed drives is a back-end track (BE TRK). The managed drives are organized into same-size units of storage capacity referred to herein as splits, partitions, or cells 201, each of which may contain multiple BE TRKs. A protection group contains member cells 201 from different managed drives, e.g., an EC (8+2) protection group "a" in the illustrated example. Other protection groups, e.g., b, c, d, and so forth, would be similarly formed. Storage resource pool 205 is a type of storage object that includes a collection of protection groups of the same type. The host application data is logically stored in front-end tracks (FE TRKs) on production volume 240. The FE TRKs of the production volume are mapped to the BE TRKs on the managed drives and vice versa by tables and pointers that are maintained in the shared memory.

Figure 3:
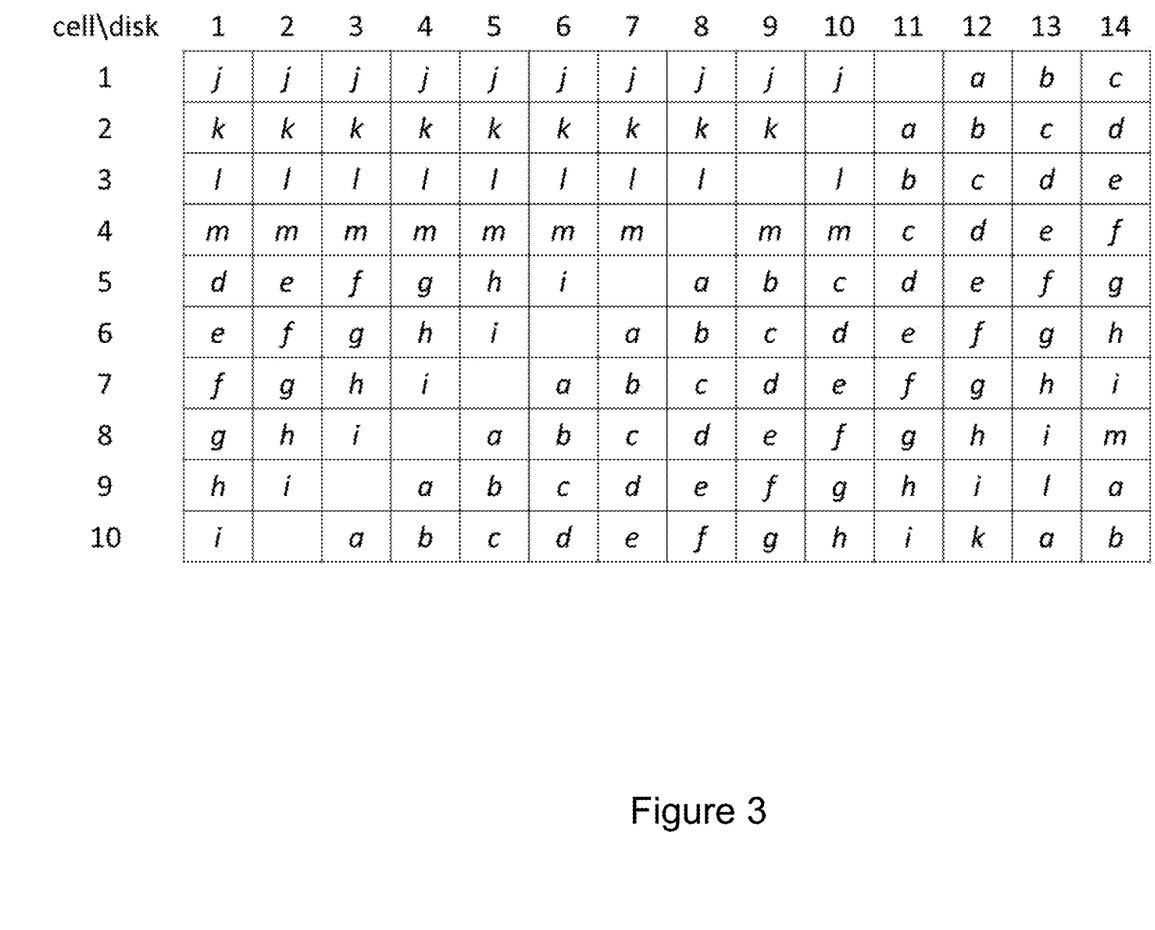
FIG. 3 illustrates a scalable, predictable distribution EC (8+2) drive cluster matrix that has been scaled from (W+1) drives to (W+4) drives.

FIG. 3 illustrates a drive cluster of (W+4) managed drives resulting from the addition of three drives to a minimal drive cluster of (W+1) drives on which EC (8+2) protection groups and spare capacity are predictably distributed. The drive cluster is represented as a matrix of sequentially numbered cell index rows and disk index columns. An initial minimal drive cluster has (W+1) drives with W same-size cells in which protection groups "a" through "j" and one drive's capacity of spares (shown as empty cells) are distributed. New protection groups "k" through "m" are created in cells that are vacated by rotation-relocation. The locations of the spares and patterns of distribution of protection group members are predictable due to the initial distribution pattern and rotation-relocation as taught by U.S. Pat. Nos. 11,340,789 and 11,314,608.

Figure 4:
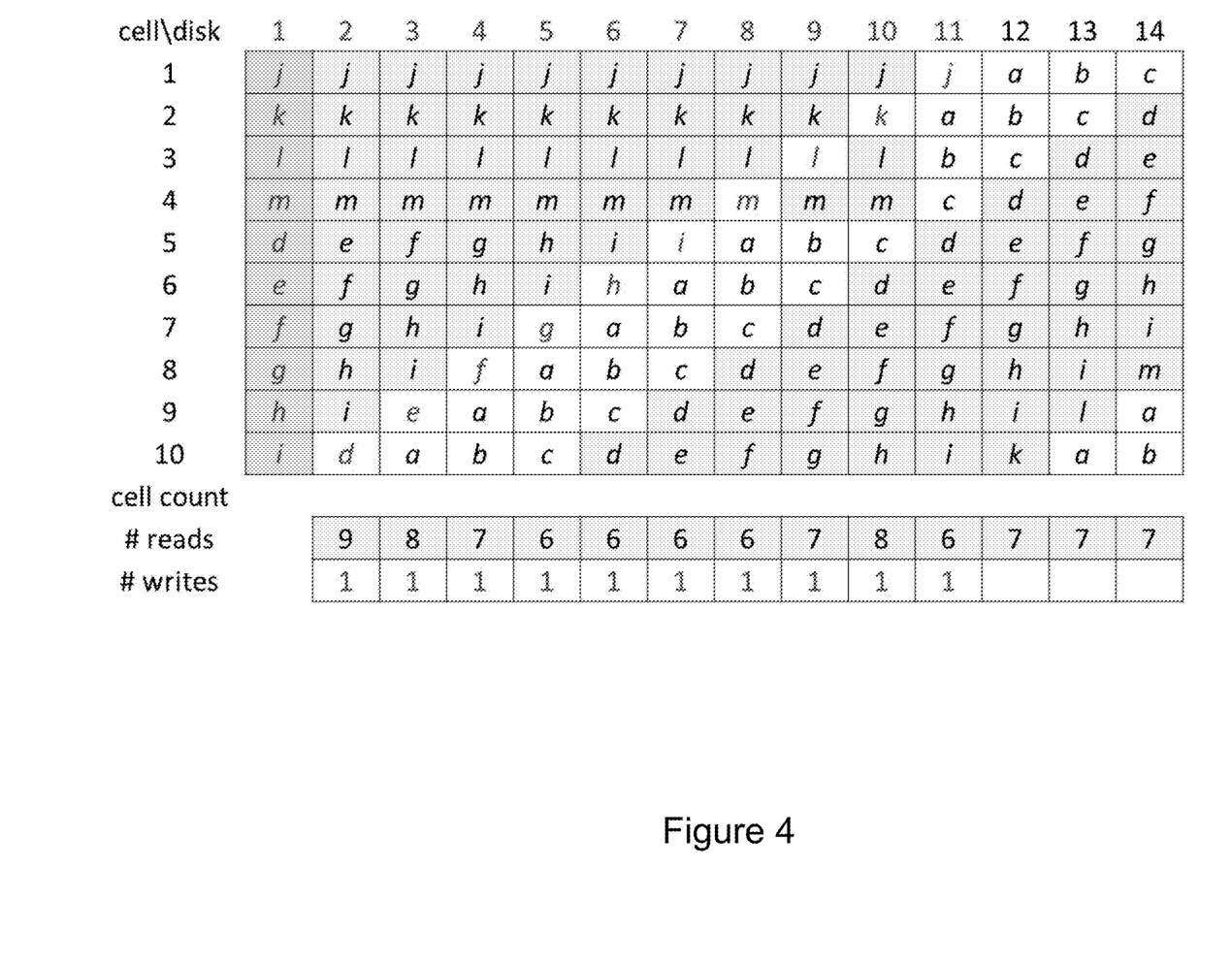
FIG. 4 illustrates unbalanced rebuild-related reads that would be performed to rebuild the protection group members of disk 1 in the absence of selective skipping.

FIG. 4 illustrates unbalanced rebuild-related reads that would be performed to rebuild the protection group members of failed disk 1 without selective skipping. Members j, k, l, m, d, e, f, g, h, i are rebuilt in the diagonally distributed spare cells favoring same-index cells as the targets. Seven members of each group must be read in order to rebuild the corresponding member that was on disk 1. Each of disks 2 through 11 processes 1 write to create the rebuilt member in a spare cell, but the reads are unevenly distributed because the number of remaining members used to rebuild the disk 1 members are not equal on each disk. Disks 5-8 and 11 only process 6 reads, whereas disk 2 processes 9 reads. The differences in numbers of reads could be larger, e.g., by an order of magnitude, in a non-simplified drive cluster. In general, the disk or disks that must process the most reads becomes a bottleneck that may determine the time required to complete the rebuild.

Figure 5:
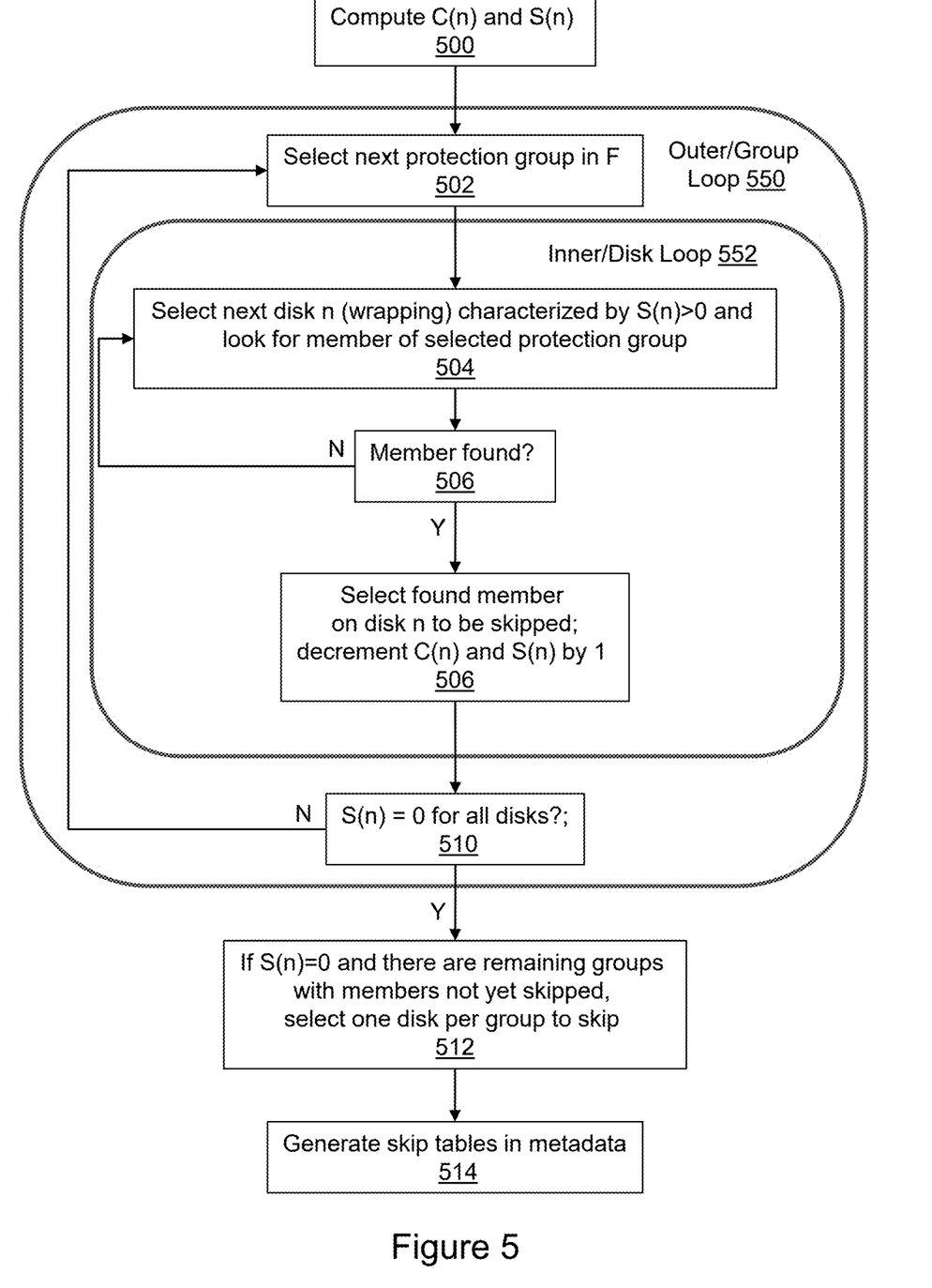
FIG. 5 illustrates a method for load balancing rebuild-related read operations by selectively skipping protection group members.

FIG. 5 illustrates a method for load balancing rebuild-related read operations by selectively skipping protection group members in multiple parity data protection systems. Step 500 is computing a read count $C(n)$ and a skip count $S(n)$ for each disk n. For EC (N+P) protection, where N is the number of non-parity members and P is the number of parity members, up to (P−1) members may be skipped for each protection group with a failed member. Skipping a member means omitting that member from the rebuild calculations, so skipped members are not read as part of the rebuilding process. In EC (8+2), N=8 and P=2 so 1 member may be skipped. In EC (7+3), N=7 and P=3 so 2 members may be skipped. F=the set of EC groups affected by the disk failure. In the example described above, F={j, k, l, m, d, e, f, g, h, i}. R=count of protection groups in F and thus the number of disks with rebuild writes. In the example described above, R=10. $C(n)$=the count of member cells on disk n belonging to a group in F. In the example described above, $C(2)$=9 and $C(5)$=6. T=Sum ($C(n)$) of R disks with rebuild writes, e.g., T=69 in the example described above. A=(T/R)−(P−1)=average count of cells to read per disk (after skips). $S(n)$=$C(n)$−A=count of cells to skip on disk n. $S(n)$ is rounded-down for non-integers. $S(n)$=0 if $C(n)$<A. In the case in which Sum($S(n)$)>R, select (Sum($S(n)$)−R) disks with positive $S(n)$, and decrement each $S(n)$ by 1.

An outer loop 550 iterates through the protection groups being rebuilt, e.g., starting with the member in the first cell of the failed disk and proceeding through the cells sequentially by index number. A protection group is selected as indicated in step 502. An inner loop 552 iterates through the remaining disks that have available skips, e.g., in sequential order by index number. The next disk with a skip count greater than 0 is selected and searched for a member of the selected protection group in step 504. If a member is not present on the disk as determined in step 506, then flow return to step 504. If a member is present, then that member is selected to be skipped and the values of $C(n)$ and $S(n)$ are decremented as indicated in step 506. If $S(n)$ is not equal to zero for all disks as determined in step 510, then flow returns to step 502. If $S(n)$=0 for all disks and there are remaining protection groups with members not yet skipped, then one disk per group is selected to be skipped as indicated in step 512. Skip tables are generated and encoded in metadata as indicated in step 514. In other words, skip tables are pre-computed relative to disk failure. This is possible because the locations of the spares and patterns of distribution of protection group members are predictable due to the initial distribution pattern and rotation-relocation. Pre-computation may be advantageous because accessing precomputed tables (or other metadata structures) may be faster than performing the calculations during the rebuild process.

Figure 6:
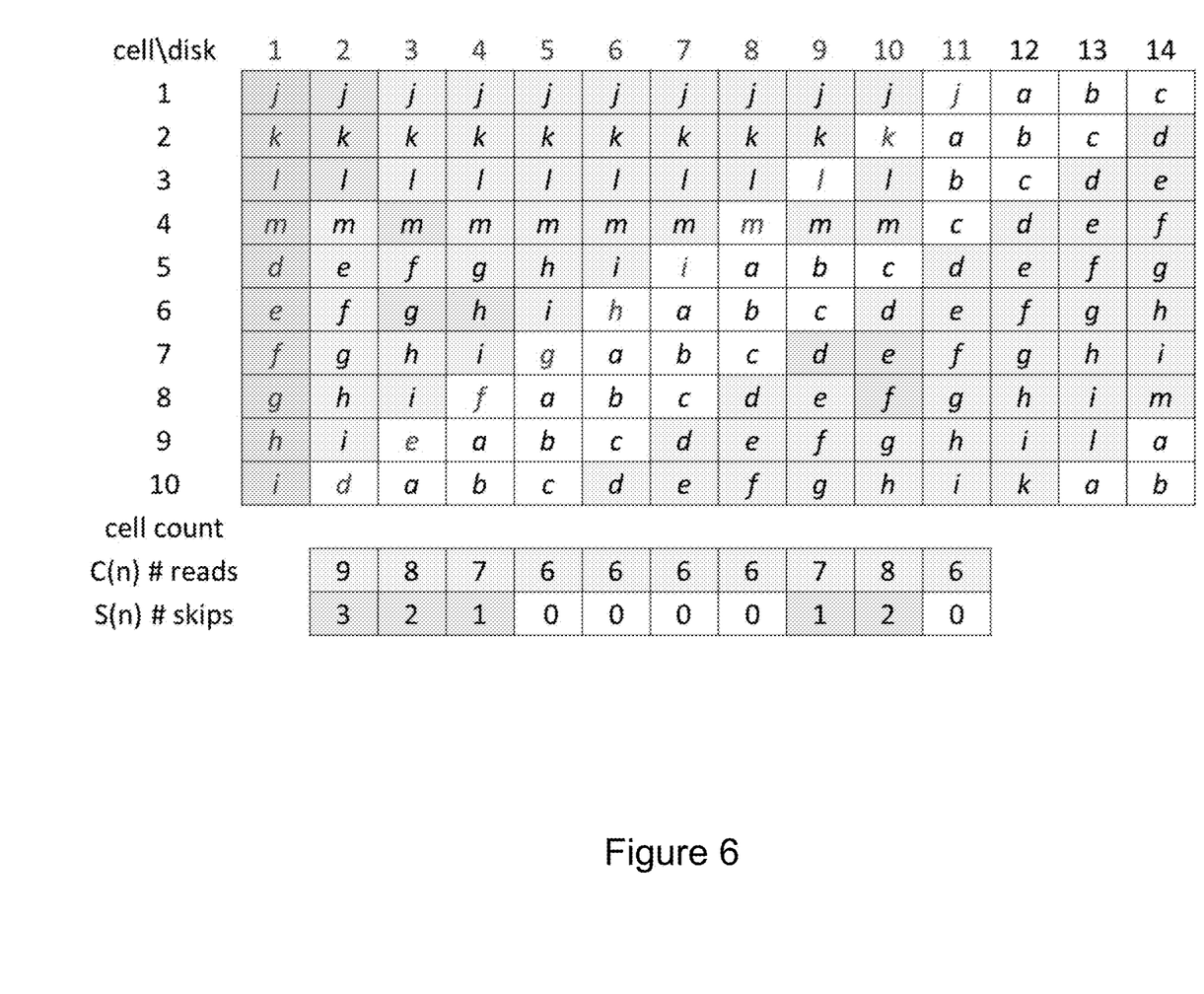
FIGS. 6 through 12 illustrate the selection of protection group members to be skipped.
Figure 7:
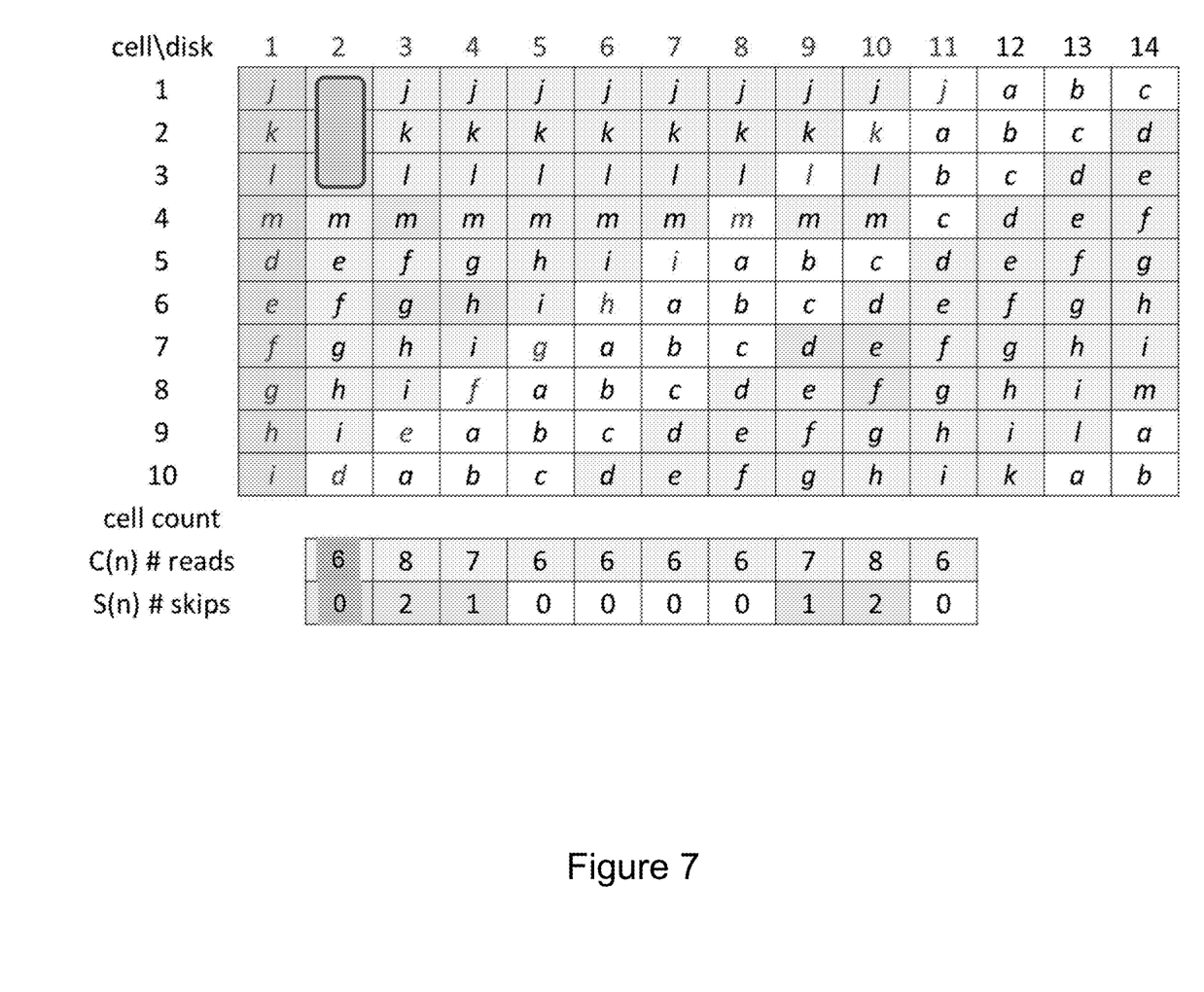
Figure 8:
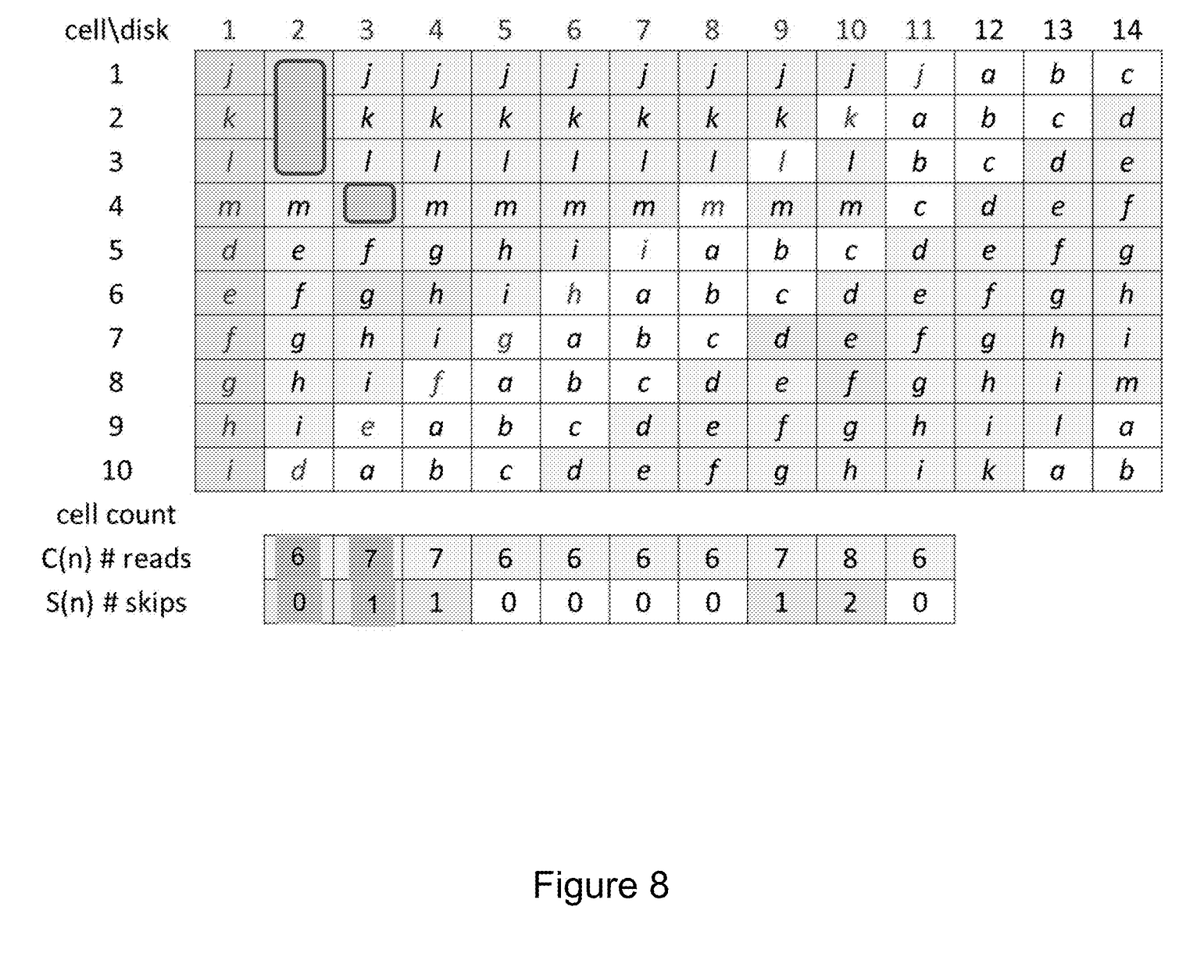
Figure 9:
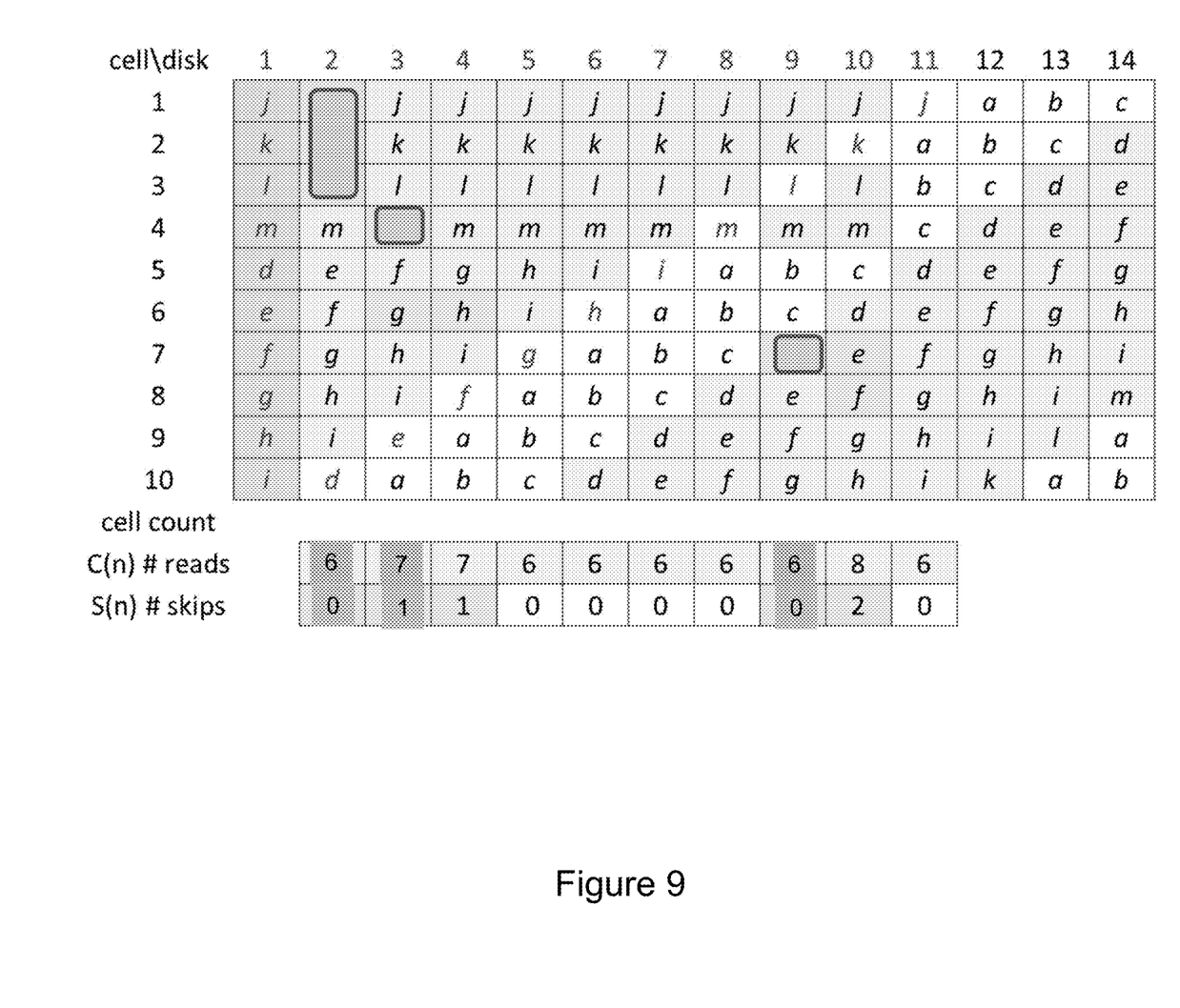
Figure 10:
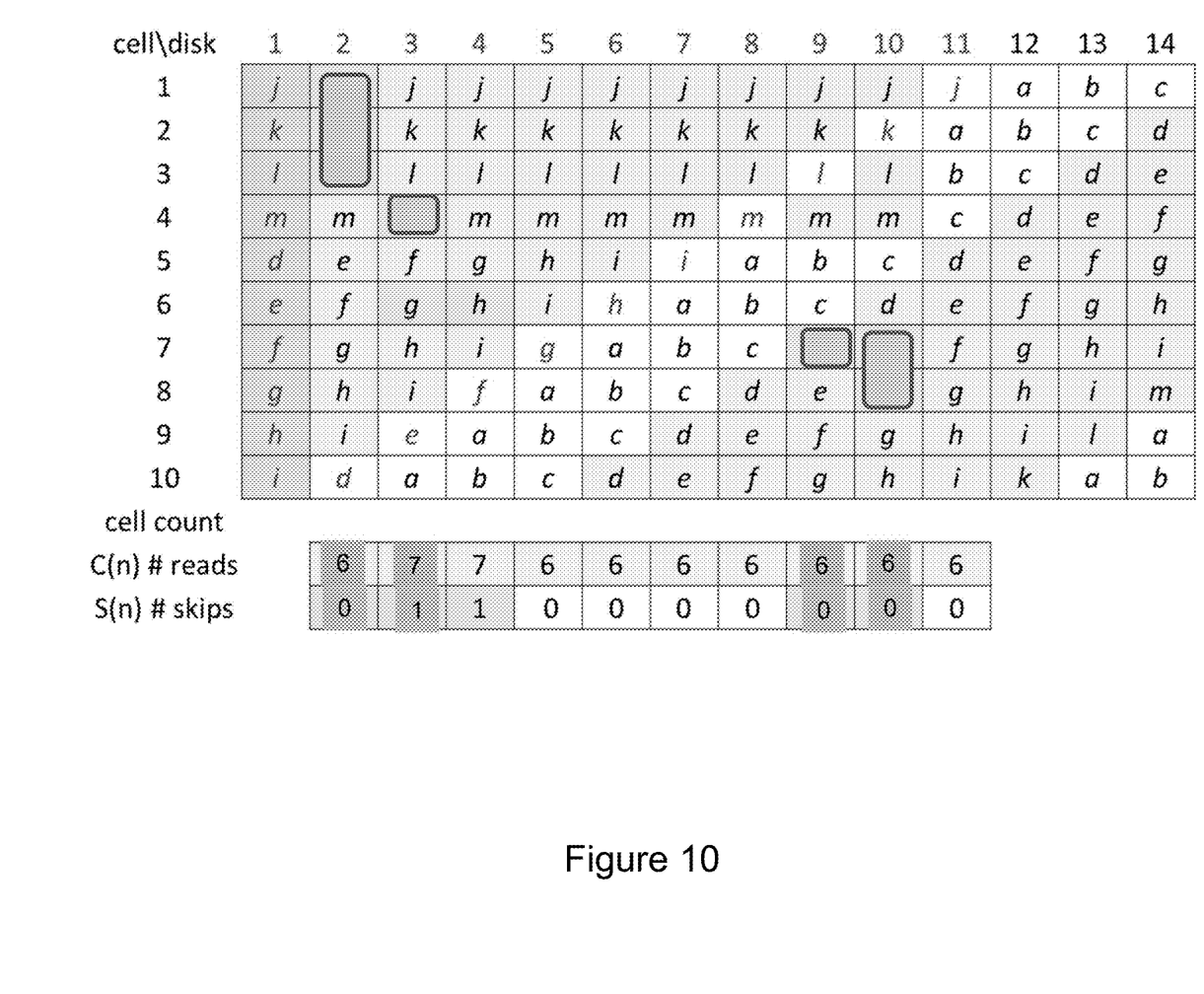
Figure 11:
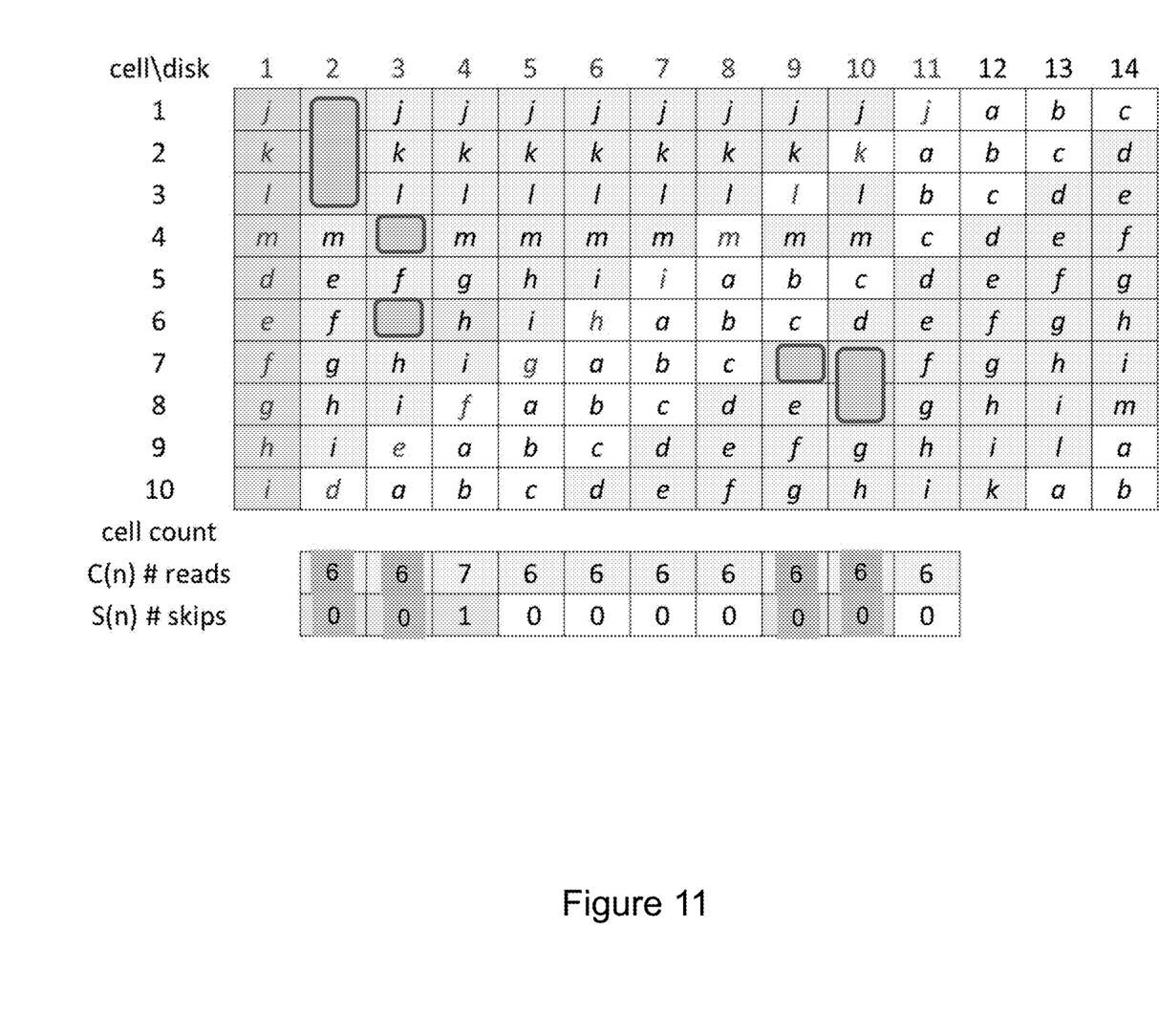
Figure 12:
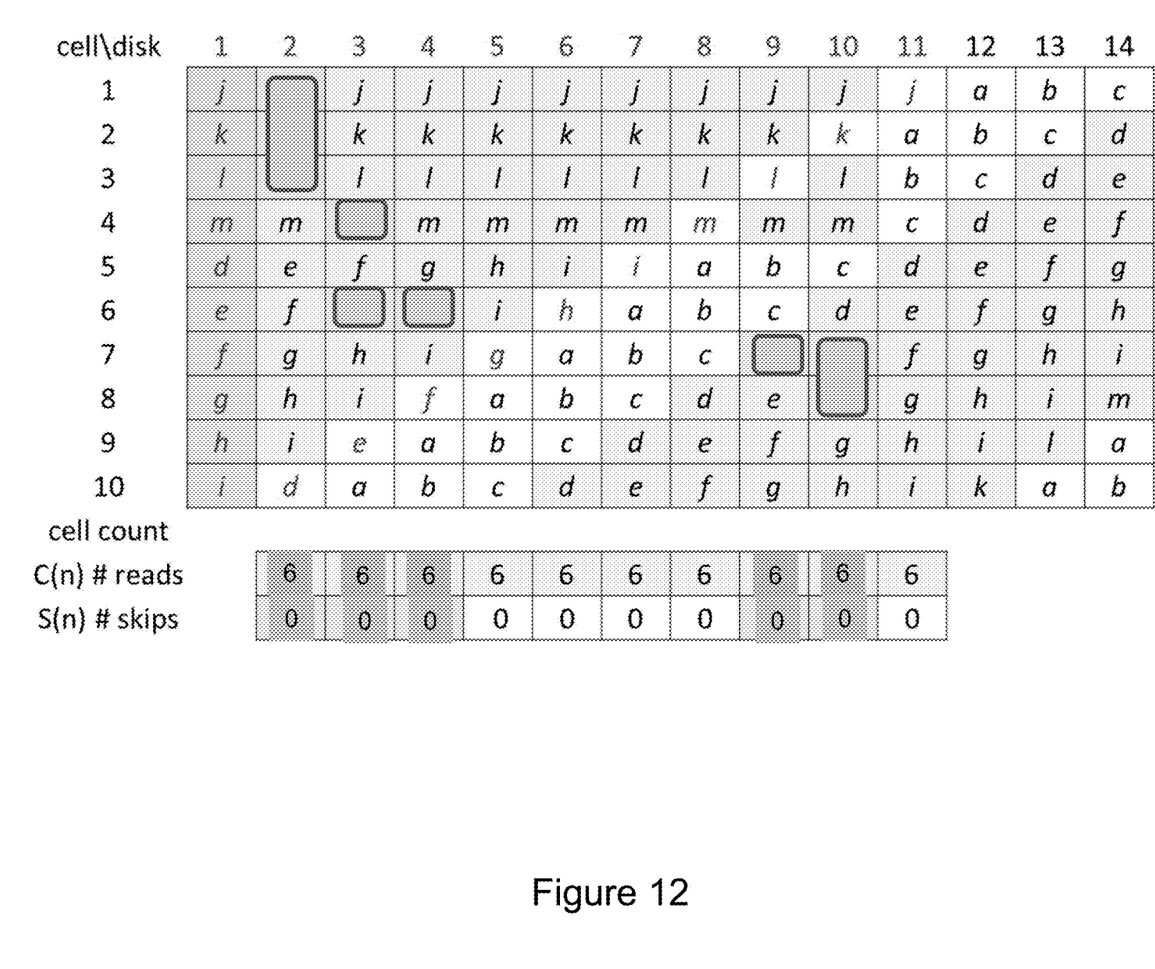

FIGS. 6 through 12 illustrate the selection of protection group members to be skipped. As shown in FIG. 6, the read count $C(n)$ and skip count $S(n)$ values have been computed for each disk n for failure of disk 1. Starting with protection group j because its member was in cell 1 of disk 1, the algorithm searches for and finds a member of j starting with disk 2, which has $S(n)$>0. That member is selected to be skipped and the values of $C(1)$ and $S(1)$ are decremented. Groups k and l are selected in subsequent iterations because their members were in cells 2 and 3 of disk 1. Corresponding members are also found on disk 2 and selected to be skipped, resulting in $S(2)$=0 and $C(2)$=6 as shown in FIG. 7. The next group selected is m because its member was in cell 4 of disk 1. Disk 2 is not searched because $S(2)$=0. Disk 3 is searched and a corresponding member is found and selected to be skipped as shown in FIG. 8. The next group selected is d because its member was in cell 5 of disk 1. Disks 3 and 4 are searched because $S(3)$ and $S(4)$ are both greater than zero but no corresponding member is found. The next disk in order with $S(n)$>0 is disk 9, on which a corresponding member is found and selected to be skipped as shown in FIG. 9. The next groups selected are e and f. $S(9)$=0 following the previous selection, so disk 10 is searched and corresponding members are found and selected to be skipped as shown in FIG. 10. The next group selected is f and disk selection wraps back to disk 3, on which a corresponding member is found and selected to be skipped as shown in FIG. 11. The next group selected is h and disk 4 is the only remaining disk with S(n)>0. A corresponding member is found and selected to be skipped on disk 4 as shown in FIG. 12. S(n)=0 and C(n)=6 for disks 2-11. Select any disk with a member of the last group i to skip. A skip table may be generated.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
for a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster, balancing rebuild-related read operations in the event of drive failure by:
computing a skip count S(n) for each non-failed drive n;
selecting a protection group having a member on a failed one of the drives;
for the selected protection group, selecting one of the non-failed drives having a corresponding member of the selected protection group and being characterized by S(n)>0;
selecting the corresponding member on the selected non-failed drive to be skipped during rebuild;
decrementing S(n); and
iterating until S(n)=0 for all the non-failed drives.

2. The method of claim 1 further comprising computing a read count C(n) as a count of partitions on drive n having protection group members in a set F of the protection groups represented on the failed drive.

3. The method of claim 2 further comprising computing the skip count S(n) as C(n)−A, where A equals an average count of cells to read per drive.

4. The method of claim 3 further comprising computing the average count of cells to read per drive A=(T/R)−1, where T=sum(C(n)) of the drives with rebuild writes and R is a count of protection groups in F.

5. The method of claim 4 further comprising rounding-down S(n) for non-integer values.

6. The method of claim 5 further comprising pre-computing the protection group members to be skipped prior to the drive failure.

7. The method of claim 6 further comprising encoding metadata with a record of pre-computed protection group members to be skipped prior to the drive failure.

8. An apparatus, comprising:
a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster;
a plurality of interconnected compute nodes that manage access to the drives; and
a rebuild controller configured to:
compute a skip count S(n) for each non-failed drive n;
select a protection group having a member on a failed one of the drives;
for the selected protection group, select one of the non-failed drives having a corresponding member of the selected protection group and being characterized by S(n)>0;
select the corresponding member on the selected non-failed drive to be skipped during rebuild;
decrement S(n); and
iterate until S(n)=0 for all the non-failed drives.

9. The apparatus of claim 8 further comprising the rebuild controller configured to compute a read count C(n) as a count of partitions on drive n having protection group members in a set F of the protection groups represented on the failed drive.

10. The apparatus of claim 9 further comprising the rebuild controller configured to compute the skip count S(n) as C(n)−A, where A equals an average count of cells to read per drive.

11. The apparatus of claim 10 further comprising the rebuild controller configured to compute the average count of cells to read per drive A=(T/R)−1, where T=sum(C(n)) of the drives with rebuild writes and R is a count of protection groups in F.

12. The apparatus of claim 11 further comprising the rebuild controller configured to round-down S(n) for non-integer values.

13. The apparatus of claim 12 further comprising the rebuild controller configured to pre-computing the protection group members to be skipped prior to the drive failure.

14. The apparatus of claim 13 further comprising the rebuild controller configured to encode metadata with a record of pre-computed protection group members to be skipped prior to the drive failure.

15. A non-transitory computer-readable storage medium storing instructions that when executed by a computer cause the computer to perform a method comprising:
for a scalable drive cluster in which multiple parity erasure coding of width W is implemented on at least W+1 sequentially indexed drives, each of the drives having W sequentially indexed partitions, each of the partitions having a fixed-size amount of storage capacity equal to storage capacity of other partitions of the scalable drive cluster, protection group members distributed to the partitions with no more than one member of a protection group located on a single one of the drives and reserve capacity partitions distributed across multiple drives of the scalable drive cluster, balancing rebuild-related read operations in the event of drive failure by:
computing a skip count S(n) for each non-failed drive n;
selecting a protection group having a member on a failed one of the drives;

for the selected protection group, selecting one of the non-failed drives having a corresponding member of the selected protection group and being characterized by $S(n)>0$;

selecting the corresponding member on the selected non-failed drive to be skipped during rebuild;

decrementing $S(n)$; and iterating until $S(n)=0$ for all the non-failed drives.

16. The non-transitory computer-readable storage medium of claim 15 in which the method further comprises computing a read count $C(n)$ as a count of partitions on drive n having protection group members in a set F of the protection groups represented on the failed drive.

17. The non-transitory computer-readable storage medium of claim 16 in which the method further comprises computing the skip count $S(n)$ as $C(n)-A$, where A equals an average count of cells to read per drive.

18. The non-transitory computer-readable storage medium of claim 17 in which the method further comprises computing the average count of cells to read per drive $A=(T/R)-1$, where $T=sum(C(n))$ of the drives with rebuild writes and R is a count of protection groups in F.

19. The non-transitory computer-readable storage medium of claim 18 in which the method further comprises rounding-down $S(n)$ for non-integer values.

20. The non-transitory computer-readable storage medium of claim 19 in which the method further comprises pre-computing the protection group members to be skipped and encoding metadata with a record of pre-computed protection group members to be skipped prior to the drive failure.

* * * * *